United States Patent
Park

(10) Patent No.: US 6,434,123 B1
(45) Date of Patent: Aug. 13, 2002

(54) APPARATUS AND METHOD FOR BROADBAND DATA COMMUNICATION

(75) Inventor: Bret Park, Garland, TX (US)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 09/221,532

(22) Filed: Dec. 28, 1998

(51) Int. Cl.$^7$ ............... H04B 3/36; H04L 12/28
(52) U.S. Cl. ............... 370/293; 370/420
(58) Field of Search ............... 370/293, 420, 370/463, 465, 400, 402, 492, 494, 497, 501, 352, 353, 354, 355, 356, 358

(56) References Cited

U.S. PATENT DOCUMENTS

| | | | | |
|---|---|---|---|---|
| 6,101,216 A | * | 8/2000 | Henderson et al. | 375/222 |
| 6,130,893 A | * | 10/2000 | Whittaker et al. | 370/420 |
| 6,175,556 B1 | * | 1/2001 | Allen, Jr. et al. | |
| 6,272,219 B1 | * | 8/2001 | De Bruycker et al. | 379/399 |

FOREIGN PATENT DOCUMENTS

| | | |
|---|---|---|
| EP | 0 828 363 A2 | 3/1998 |
| WO | WO 98/34379 | 8/1998 |
| WO | WO 98/54856 | 12/1998 |

OTHER PUBLICATIONS

ISR for PCT/US 99/30829; completed Mar. 31, 2000.

* cited by examiner

Primary Examiner—Wellington Chin
Assistant Examiner—Brenda Pham
(74) Attorney, Agent, or Firm—Jenkens & Gilchrist, P.C.

(57) ABSTRACT

A device and method are disclosed for providing a phone LAN routing LAN traffic internally within Customer Premise Equipment (CPE) and for routing analog and digital traffic from a Public Switched Telephone Network (PSTN) to the CPE. A phone hub routes LAN traffic and incoming voice and ADSL to network elements having a network interface controller (NIC). Analog voice signals are transparently coupled through the phone hub. Inbound ADSL data is transported using the phone hub at LAN frequency to a NIC. Outbound ADSL data transported to the phone hub at the second frequency is frequency shifted by the phone hub back to the first frequency for transport over the PSTN. Broadband 10BASE-T Ethernet frequencies are accommodated using customer premise wiring.

30 Claims, 3 Drawing Sheets

APPARATUS AND METHOD FOR BROADBAND DATA COMMUNICATION

FIELD OF THE INVENTION

The present invention relates to computer networks, and more particularly, but not by way of limitation, to a phone Local Area Network (LAN) for providing broadband data communication between network elements over a two-wire medium.

BACKGROUND OF THE INVENTION

As prices for computers and peripherals decrease more homes and small business are increasing the number of computers and peripherals present in these computing environments. As the number of computers, peripherals, and other automated equipment, such as computerized home appliances, increases in the home or small business environments, it is increasingly important for such elements to be interconnected, for example, in a Local Area Network or LAN configuration. Interconnection allows hardware resources, such as printers, to be shared between a number of computers or accessed from many locations, allows high speed data transfer between devices, and further allows devices to be controlled remotely by other devices in the network.

Many high speed networking alternatives are available for large businesses but such alternatives require a large investment in networking resources. In contrast, choices for a home or small business network are limited by practical and economic factors such as the cost of the new wiring or cabling, especially given that utility wiring may already exist at the respective premises. It should be understood that the cost associated with rewiring a home to provide cable capable of carrying signals at network frequencies can be prohibitive.

Ethernet technology is commonly used in businesses for providing network connectivity, and has evolved into successively more robust forms over many years. One commonly used baseband Ethernet technology is known as the 10BASE-T network. The 10BASE-T network has an operating rate of 10 Mbps, is compliant with LAN 802.3 standards and specifications, and thereby provides moderate to high speed interconnectivity between many workstations and peripherals for most applications.

In a conventional business LAN application, workstations and peripherals, such as printers and disk towers, are wired together to allow shared access, data transfer, and communication between individual user workstations and network devices. A typical 10BASE-T network interface card (NIC) is located at each workstation and network device and accommodates two pairs of (category 5) unshielded twisted-pair wires. Under the 10BASE-T standard, one twisted pair is used for data transmission and another twisted pair is used for data reception. Due to the specialized nature of the interface circuitry and the common mode noise rejecting capability of the "twisted" configuration of the actual wire pair or, alternatively, the noise rejecting capability of shielded coaxial cable, relatively high data rates may be achieved. In the typical home, however, existing coaxial cables for cable TV service cannot be used to transmit data because of the resulting signal interference, and twisted wires pairs are unavailable. Accordingly, high data rate networks are not possible without expensive rewiring.

Some proposed solutions to home networking include standard modem technology, digital subscriber line (xDSL) technology, and wireless technology. Standard modem technology has traditionally been limited to data speeds of 56 kbps and requires very complicated circuitry and high quality line characteristics not readily available in a typical home. Although, xDSL technology can transmit data at a much higher rate than standard modem technology, the cost of implementation of xDSL is at present very high and requires very complicated modulation methods. High quality line characteristics, such as signal-to-noise ratio, may also be required with xDSL technology to meet theoretical objectives.

Wireless solutions allow for connectivity between elements, typically using frequencies around 900 MHz, but have certain drawbacks. Since wireless portable phones are often operated in neighboring bands, there is a high likelihood of signal interference between a wireless LAN and portable phones or household devices, such as televisions, computers, garage door openers, alarm systems, and the like.

Despite the many potential solutions to home and small business networking, problems arise in providing LAN type networking in view of the presence of existing customer premises traffic whether voice traffic, xDSL traffic, or both. In addition, the cost associated with independent wiring to accommodate LAN networking on the customer premises has been prohibitive.

Therefore, as can be appreciated, there is a need to provide LAN compliant home networking that is available at a low cost, and that can provide high data rates while taking advantage of existing four wire phone lines without disrupting existing traffic.

SUMMARY OP THE INVENTION

The present invention overcomes the above-identified problems, as well as other shortcomings and deficiencies of existing technologies, by providing a phone Local Area Network (LAN), including a phone HUB for routing LAN traffic between network elements within the customer premises and for routing analog and digital traffic from a Public Switched Telephone Network (PSTN) to network elements and telephone sets within the customer premises.

The phone hub of the present invention may be coupled between the PSTN and particular Customer Premises.Equipment (CPE). One or more network elements, each having a specially adapted network interface controller (NIC), are interconnected through the customer premises wiring plant and a router. Analog voice signals are transparently transferred from the PSTN to the customer premises wiring plant through the phone hub using a splitter, such that voice traffic in either direction is unaffected by the presence or the absence of digital data. Inbound digital data, advanced DSL or ADSL data for example, separated from voice signals at the splitter at a first frequency, is transported using the router at a second higher frequency to a specially adapted NIC at each network element. Outbound digital data at the first frequency is transported to the router at the second frequency by the specially adapted NIC. Outbound digital data transported at the second frequency may be frequency shifted by the router back to the first frequency for transport in the conventional manner over the PSTN.

The specially adapted NIC operates at broadband 10BASE-T Ethernet frequencies and can accommodate common telephone connectors, such as RJ-11 style connectors used in standard residential telephone communications. A Media Access Control (MAC) function of such a specially adapted NIC provides one fixed frequency channel, a frequency channel at a higher range, such as the range at 1 MHz above the ADSL range from about 2–3 MHZ would be occupied by 802.3 LAN traffic at 8 Mbps.

Standard telephone units are accommodated by the phone LAN in that standard RJ-11 style connectors and the customer premises wiring plant are used. The phone hub provides an interface between the local loop connection and the customer premises wiring. By plugging into, for example, the standard RJ-11 wall outlet, a standard telephone unit would receive the 4 KHz analog voice band channel routed transparently through the splitter for reception by any standard telephone unit of standard voice traffic whether or not phone LAN traffic was being processed at the higher frequency bands.

BRIEF DESCRIPTION OF THE DRAWINGS

A more complete understanding of the present invention is made by reference to the following Detailed Description and appended claims when taken in conjunction with the accompanying Drawings wherein:

DETAILED DESCRIPTION OF THE PRESENTLY PREFERRED EXEMPLARY EMBODIMENTS

Figure 1A:
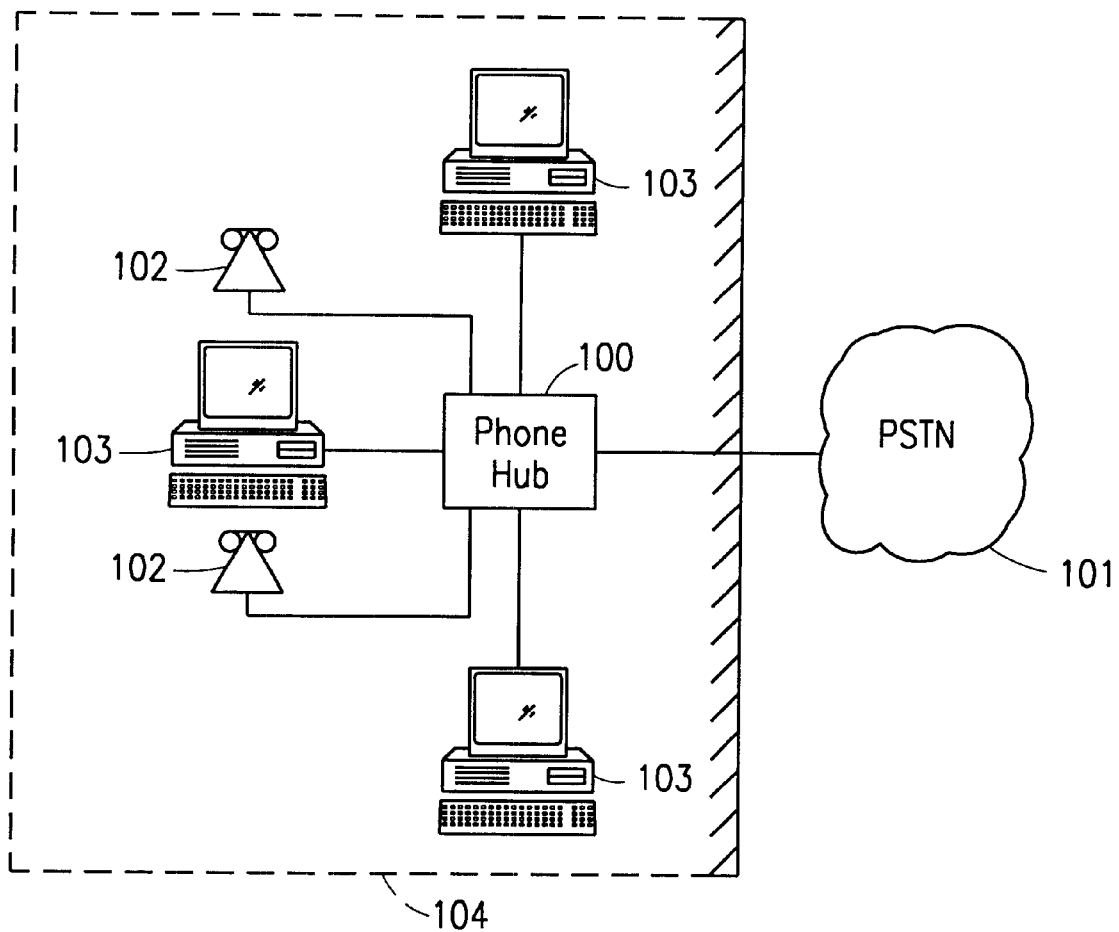
FIG. 1A is a block diagram illustrating an exemplary phone LAN.

The present invention will now be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. With reference now to FIG. 1A, there is shown a block diagram of a phone hub 100, which may provide Local Area Network or LAN routing for relatively high rate data communications between network elements, including various telephone sets 102 and a number of network elements, generally referenced by the numeral 103. It should be understood that network element 103 is so designated for the sake of simplicity, but may represent a variety of network elements, including a computer, a printer or peripheral, an automated home appliance, a modem, and the like. It should also be understood that the respective telephone sets 102 may each represent an analog voice telephone of the kind typically contemplated for subscriber service in a Digital Loop Carrier system.

Public Switched Telephone Service (PSTN), generally referenced by the numeral 101, is shown terminating at a Customer Premises Equipment (CPE) boundary 105 at a given customer premises, designated in outline form by the reference numeral 104. Phone hub 100 of the present invention may be connected between PSTN 101 and one or more network elements 103 and, optionally, a standard telephone set 102, as illustrated in FIG. 1A. As shown in greater detail in FIG. 1B, however, phone hub 100 receives signals from PSTN at voice band or a digital band, for example via ADSL, both of which require transport to their ultimate destination, which may be the telephone set 102 in the case of a voice band signal or the network element 103 in the case of a digital band signal. It should be understood that it is not inconsistent with the teachings of the present invention for both voice band and digital band signals to be received from the PSTN 105 and both processed in the phone hub 100.

Figure 1B:
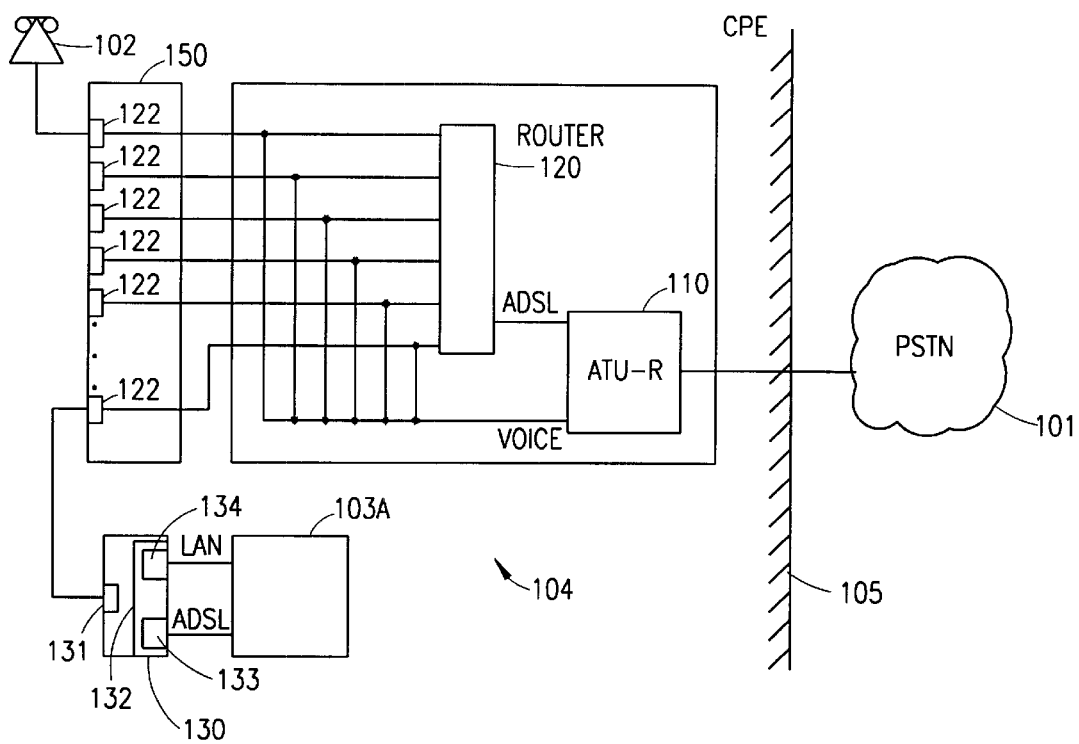
FIG. 1B is a more detailed block diagram further illustrating an exemplary phone hub in accordance with the present invention.

To ensure that voice band signals are unaffected by the presence or absence of digital signals, a splitter 110 may incorporate ADSL MODEM functionality and may further integrate ADSL Transmission Unit Remote (ATU-R) functionality to split the voice band signals and ADSL band signals. As shown in FIG. 1B, voice signals are then routed transparently through a two wire plant 150 and to a number of connectors 122, which may be common connectors, such as RJ-11 connectors, as known in the art to be commonly used in household telephone outlets. Thus, any telephone set 102 may be connected to any connector 122 and receive normal voice band telephone service regardless of the presence of out of band signals, such as ADSL signals, and, as will be described hereinafter, LAN signals at LAN frequencies in accordance with the present invention. The splitter 110 may further route ADSL signals to a LAN router 120, which may be an intelligent router configured to transport ADSL data at a LAN frequency, through the two wire plant 150 and the connector 122 to a given network element 103A by way of a Network Interface Card (NIC) 130.

The NIC 130 may be a 10BASE-T Ethernet NIC specially adapted for use in the phone LAN of the present invention by being equipped with, for example, a standard RJ-11 style connector 131, as shown in FIG. 1B. Since the wiring in the two wire plant 150, in a residential or small business application, is within a reasonable range, e.g., not greater than 1 km, it is practical to transmit data, including frequency-shifted ADSL, at phone LAN frequencies throughout the customer premises using the phone LAN of the present invention. Conversion of frequency-shifted ADSL to baseband for transfer to the network element 103, which may be, for example, a personal computer system, may be accomplished using a specially adapted Media Access Control (MAC) 132.

The MAC 132 may be specially adapted for use in the phone LAN of the present invention. A first frequency channel may be provided by the MAC 132 using, for example, an ADSL module 133. The ADSL module 133 may decode data embedded in a LAN data packet received at the NIC 130 from the LAN router 120, convert it back into ADSL baseband, and pass the ADSL data to the network element 103 for processing if appropriate. A second higher frequency may be provided by LAN module 134 for data transfer to network element 103 at LAN frequencies. LAN data from any of the network elements 103 may be routed through the LAN router 120 to any other network element 103, for example, based on conventional LAN 802.3 addressing. The LAN router 120 is preferably an intelligent router capable of providing a bridge between ADSL protocol and a higher frequency LAN protocol used within the phone LAN of the present invention. Similarly, the LAN router 120 is preferably capable of converting ADSL, transported from network element 103 at LAN frequencies using LAN protocols, back to ADSL for transfer through the splitter 110 and back through the PSTN 101 to its ultimate destination, for example, an ATU-C located at a Central Office serving the customer premises 104.

Figure 2:
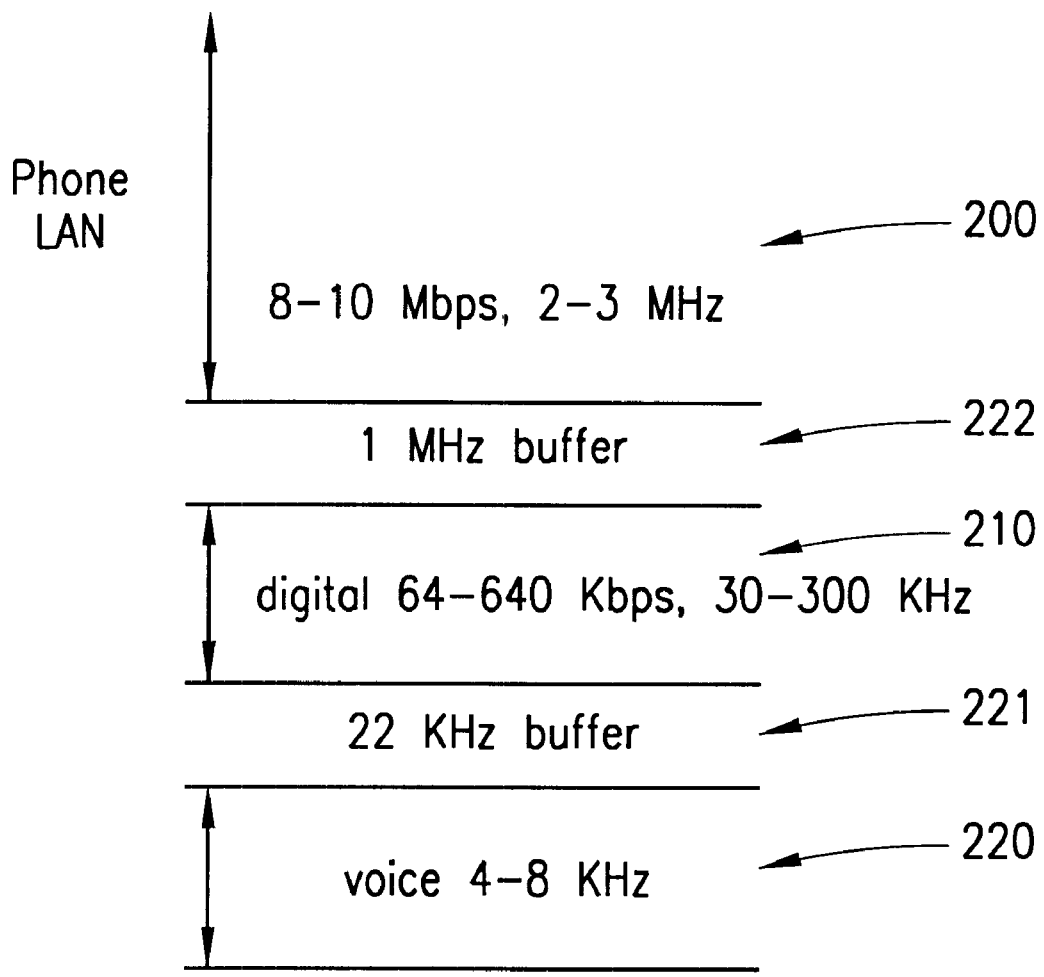
FIG. 2 is a graph illustrating the allocation of frequency bands for signals transported in an exemplary phone LAN in accordance with the present invention.

With reference now to FIG. 2 of the Drawings, a graph is shown indicating the frequency bands occupied by signals transported in accordance with the present invention. Voice signals are shown occupying a voice band, generally designated by the reference numeral 220, a 4 KHz band between 4 KHz and 8 KHz, as is conventionally known in the art. A buffer zone 221 is shown as a 22 KHz buffer to provide isolation between the aforementioned voice band 220 and a digital band, generally designated by the reference numeral 210, which may be from around 30–300 kHz to provide digital signals ranging from 64–640 kbps, as might be used for example in ADSL. A second buffer zone 222 of about 1 MHz may be established from the upper boundary of the digital band 210 to the beginning of another digital band 200, which ranges from about 2 to about 3 MHz, as is shown in FIG. 2, and can accommodate digital signals ranging from around 8 Mbps, as is used, for example, in 802.3 LAN transport. It should be understood that, in accord with the preferred embodiment of the present invention, for example, voice signals within the voice band 220 may be transparently routed from the PSTN 101, shown in FIGS. 1A and 1B, through the phone hub 100, to the customer premises wiring plant 150 where a standard telephone set 102 may, if connected at one of the connectors 122, receive and transmit voice signals, which are unaffected by the presence of signals in the digital bands 210 and 200. Moreover, signals in digital band 210 may be separated in the splitter 110, coupled to the router 120, and transported through the router 120 in the digital band 200 in accordance with the invention as previously described for example, in reference to FIG. 1B of the Drawings.

Although a preferred embodiment of the present invention has been illustrated in the accompanying Drawings and described in the foregoing Detailed Description, it will be understood that the invention is not limited to the embodiment disclosed, but is capable of numerous rearrangements, modifications and substitutions without departing from the spirit of the invention as set forth and defined by the following claims.

What is claimed is:

1. A device for providing data communications within a customer premises between a Public Switched Telephone Network (PSTN) and a customer premises wiring plant, the customer premises wiring plant including a plurality of connectors and one or more network elements connected thereto, the device comprising:
   a splitter including an ADSL Transmission Unit-Remote (ATU-R), connected to the PSTN, for receiving and separating a PSTN signal into a voice signal and a digital signal and coupling the voice signal through the customer premises wiring plant on a plurality of lines to said plurality of connectors at a first frequency, wherein said digital signal comprises an ADSL signal, said PSTN signal contains the ADSL signal and the voice signal; and
   a router, coupled to said splitter and the customer premises wiring plant, for receiving the digital signal from the splitter and transmitting the digital signal through the customer premises wiring plant on a selected one of a plurality of lines that is also carrying the voice signal to a selected one of the same plurality of connectors at a second frequency.

2. The device as recited in claim 1, wherein said splitter further comprises an ADSL MODEM.

3. The device as recited in claim 1, wherein said one or more network elements further comprise a network interface for receiving the digital signal at the second frequency.

4. The device as recited in claim 3, wherein said network interface further comprises a Media Access Control (MAC) for receiving said digital signal at the second frequency and separating the digital signal at the second frequency into a first channel for transmitting the digital signal at the second frequency to at least one of the one or more network elements and a second channel for transmitting the digital signal at a third frequency to the at least one or more network elements.

5. The device as recited in claim 1, wherein said router further comprises an 802.3 LAN router.

6. A device for providing data communications within a customer premises between a Public Switched Telephone Network (PSTN) and a customer premises wiring plant, the customer premises wiring plant including a plurality of connectors and one or more network elements connected thereto, the device comprising:
   a splitter, connected to the PSTN, for receiving and separating a PSTN signal into a voice signal and a digital signal and coupling the voice signal through the customer premises wiring plant on a plurality of lines to said plurality of connectors at a first frequency; and
   an intelligent 802.3 LAN router, coupled to said splitter and the customer premises wiring plant, for receiving the digital signal from the splitter and transmitting the digital signal through the customer premises wiring plant on a selected one of the plurality of lines that is also carrying the voice signal to a selected one of the same plurality of connectors at a second frequency wherein the digital signal is an ADSL signal, said intelligent 802.3 LAN router being configured to transport the ADSL signal to at least one of the one or more network elements as a LAN signal at the second frequency.

7. The device as recited in claim 6, wherein said network interface comprises a Media Access Control (MAC) for receiving the LAN signal, and separating the LAN signal into an ADSL channel and a LAN channel.

8. A method for providing data communications within a customer premises between a Public Switched Telephone Network (PSTN) and a customer premises wiring plant, said customer, premises wiring plant including a plurality of connectors and one or more network elements connected thereto, said method comprising the steps of:
   receiving, by a splitter, a PSTN signal containing a digital signal and a voice signal, wherein the digital signal comprises an ADSL signal;
   separating, by the splitter, the PSTN signal into the voice signal and the digital signal;
   coupling, by the splitter, said voice signal through the customer premises wiring plant on a plurality of lines to said plurality of connectors at a first frequency;
   receiving, by a router, said data signal; and
   transmitting, by the router, said digital signal through the customer premises wiring plant on a selected one of the plurality of lines that is also carrying the voice signal to a selected one of said same plurality of connectors to a second frequency.

9. The method as recited in claim 8, wherein said one or more network elements further comprise a network interface, said method further comprising the step of:
   receiving, at said network interface, the digital signal at the second frequency.

10. The method as recited in claim 9, wherein said network interface further comprises a Media Access Control (MAC), said method further comprising the steps of:
   receiving said digital signal at said second frequency; and
   separating said digital signal at said second frequency into a first channel for transmitting the digital signal at the second frequency to at least one of the one or more network elements and a second channel for transmitting the digital signal at a third frequency to the at least one of the one or more network elements.

11. The method as recited in claim 8, wherein the step of transmitting further comprises transmitting LAN 802.3 data.

12. The method as recited in claim 8, wherein said digital signal is an ADSL signal, and wherein the method further comprises the step of transporting the ADSL signal to at least one of the one or more network elements as a LAN signal.

13. The method as recited in claim 12, wherein said network interface further comprises a Media Access Control (MAC), said method further comprising the steps of:
receiving said LAN signal, and
separating said LAN signal into an ADSL channel and a LAN channel.

14. The method as recited in claim 8, further comprising, prior to said transmitting step, the step of:
frequency shifting the digital data signal received by the router from a third frequency to the second frequency.

15. A device for providing data communications within a customer premises between a Public Switched Telephone Network (PSTN) and a customer premises wiring plant, the customer premises wiring plant including a plurality of connectors and one or more network elements connected thereto, the device comprising:
a splitter, connected to the PSTN, for receiving and separating a PSTN signal into a voice signal and a digital signal and coupling the voice signal through the customer premises wiring plant on a plurality of lines to said plurality of connectors at a first frequency; and
a router, coupled to said splitter and the customer premises wiring plant, for receiving the digital signal from the splitter and transmitting the digital signal through the customer premises wiring plant on a selected one of the plurality of lines that is also carrying the voice signal to one of the same plurality of connectors at a second frequency wherein said router further being configured to route data signals between the one or more network elements via said customer premises wiring plant.

16. The device as recited in claim 1, wherein said router being further configured to frequency shift the digital signal received from the splitter from a third frequency to the second frequency.

17. A device for providing data communications within a customer premises between a Public Switched Telephone Network (PSTN) and a customer premises wiring plant, the customer premises wiring plant including a plurality of connectors and at least one network element connected thereto, the device comprising:
an ADSL Transmission Unit-Remote (ATU-R) for separating a received PSTN signal into a voice signal and an ADSL signal, the voice signal being provided through the customer premises wiring plant on a plurality of lines to the plurality of connectors at a first frequency; and
a router, coupled to said ATU-R and the customer premises wiring plant, for receiving the ADSL signal from said ATU-R and transmitting a LAN signal containing the ADSL signal through the customer premises wiring plant on a selected one of the plurality of lines that is also carrying the voice signal to a selected one of the same plurality of connectors at a second frequency.

18. The device as recited in claim 17, wherein said at least one network element further comprise a network interface for receiving the LAN signal at the second frequency.

19. The device as recited in claim 18, wherein said network interface comprises a Media Access Control (MAC) for receiving the LAN signal, and separating the LAN signal into an ADSL channel and a LAN channel.

20. The device as recited in claim 18, wherein said network interface further comprises a Media Access Control (MAC) for receiving said LAN signal at the second frequency and separating the LAN signal at the second frequency into a first channel for transmitting the ADSL signal at a third frequency to the at least one network element and a second channel for transmitting the LAN signal at the second frequency to the at least one network element.

21. The device as recited in claim 17, wherein said router further comprises an 802.3 LAN router.

22. A system for providing communication in a customer premises wiring plant, said system comprising:
a splitter for receiving signals from a PSTN and separating the signals into voice signals at a first frequency and data signals at a second frequency;
the customer premises wiring plant coupling the voice signals at the first frequency to a plurality of connectors; and
a router for receiving the data signals at the second frequency from said splitter, frequency shifting the data signals from the second frequency to a third frequency and transmitting the data signals at the third frequency through the customer premises wiring plant to given ones of the same plurality of connectors.

23. The system according to claim 22, wherein said router being configured to route data signals at the third frequency between a plurality of network elements each connected to one of the plurality of connectors.

24. The system according to claim 22, further comprising a plurality of network elements each including a network interface card, said network interface card receiving the data signals from said router and providing the data signals to the respective one of said plurality of network elements.

25. The system according to claim 24, wherein said network interface card further comprises a Media Access Control (MAC) unit that generates a LAN signal and an ADSL signal from the data signal, said network interface card provides the LAN signal and the ADSL signal on separate channels.

26. The system according to claim 22, wherein said first frequency is a baseband frequency, wherein said second frequency is an ADSL frequency and wherein said third frequency is a LAN frequency.

27. A method for providing data communications within a customer premises, said method comprising the steps of:
separating PSTN signals into voice signals and digital data signals;
coupling the voice signals through a customer premises wiring plant to a plurality of connectors at a first frequency;
receiving, by a router, the digital data signals at a second frequency;
frequency shifting the digital data signals from the second frequency to a third frequency; and
transmitting the frequency shifted digital data signals through the customer premises wiring plant to given ones of the same plurality of connectors at the third frequency.

28. The method according to claim 27, wherein said first frequency is a baseband frequency, wherein said second frequency is an ADSL frequency and wherein said third frequency is a LAN frequency.

29. The method according to claim 27, further comprising, after said step of transmitting, the steps of:
receiving the digital data signal at a network interface card within a network element connected to one of the plurality of connectors;

converting the digital data signal into a LAN signal and an ADSL signal; and providing both the LAN signal and the ADSL signal to the network element.

30. A network element connected to one of a plurality of connectors within a customer premises wiring plant, said network element comprising:

a network interface controller (NIC) configured to receive digital signals from a router through the cusomter premises wiring plant, said digital signals are received at a first frequency irrespective of the presence of voice signals at the plurality of connectors at a second frequency;

wherein the customer premises wiring plant is a conventional two wire plant capable of simultaneously carrying both the digital signal and the voice signal; and a media access control (MAC) comprising:

an ADSL module for decoding data contained within the digital signal received by the NIC and supplying the data to the network element at a third frequency; and a LAN module for providing the digital signal to the network element at the first frequency.

* * * * *

UNITED STATES PATENT AND TRADEMARK OFFICE
CERTIFICATE OF CORRECTION

PATENT NO.     : 6,434,123 B1
DATED          : August 13, 2002
INVENTOR(S)    : Bret Park It is certified that error appears in the above-identified patent and that said Letters Patent is hereby corrected as shown below:

<u>Column 2,</u>
Line 30, replace "OP" with -- OF --
Lines 41-42, replace "Premises.Equipment" with -- Premises Equipment --

<u>Column 5,</u>
Line 21, replace "described" with -- described, --
Line 51, replace "a" with -- the --

<u>Column 6,</u>
Line 33, replace "customer," with -- customer --
Line 44, replace "data" with -- digital --
Line 48, replace "to" with -- at --

<u>Column 9,</u>
Line 9, replace "cusomter" with -- customer --

Signed and Sealed this

Third Day of December, 2002

JAMES E. ROGAN
*Director of the United States Patent and Trademark Office*